(No Model.) 2 Sheets—Sheet 2.

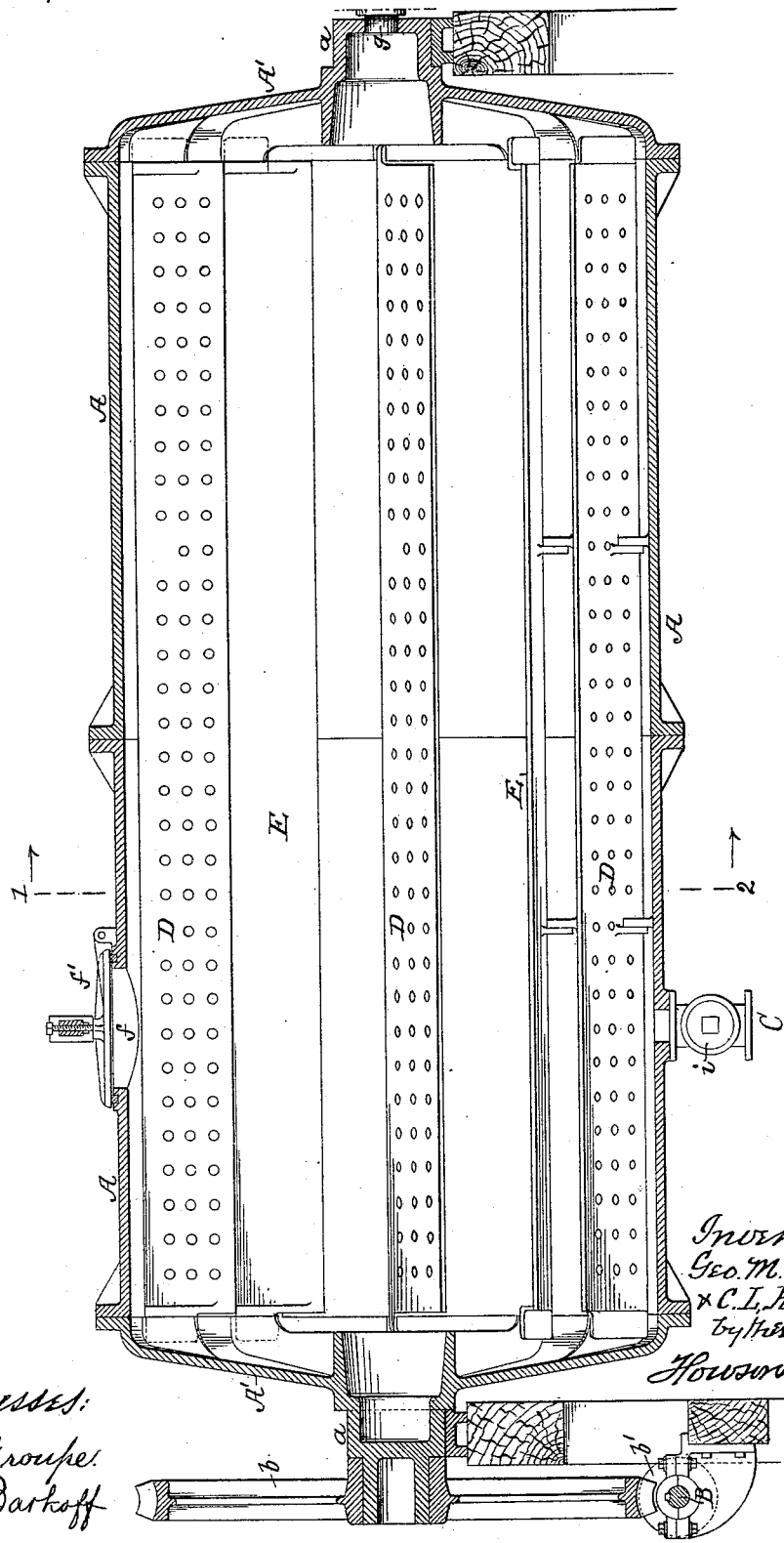

G. M. NEWHALL & C. L. HAMILTON.
CHLORIDE OF LIME DISSOLVER.

No. 489,261. Patented Jan. 3, 1893.

Witnesses:
A. V. Groupe.
Alex. Barkoff

Inventors:
George M. Newhall
& Charles L. Hamilton
by their Attorneys
Howson & Howson

UNITED STATES PATENT OFFICE.

GEORGE M. NEWHALL AND CHARLES L. HAMILTON, OF PHILADELPHIA, PENNSYLVANIA.

CHLORIDE-OF-LIME DISSOLVER.

SPECIFICATION forming part of Letters Patent No. 489,261, dated January 3, 1893.

Application filed January 21, 1890. Serial No. 337,640. (No model.)

*To all whom it may concern:*

Be it known that we, GEORGE M. NEWHALL and CHARLES L. HAMILTON, citizens of the United States, and residents of Philadelphia, Pennsylvania, have invented certain Improvements in Chloride-of-Lime Dissolvers, of which the following is a specification.

Our invention is a revolving dissolver for chloride of lime used in the process of manufacturing paper.

The main object of our invention is to maintain a perfectly uniform density of the fluid during the process of dissolving and by providing a rotary dissolver the material can be more quickly dissolved and agitated than heretofore. This vessel being closed retains the volatile chlorine gas which becomes absorbed by the water.

Figure 3:
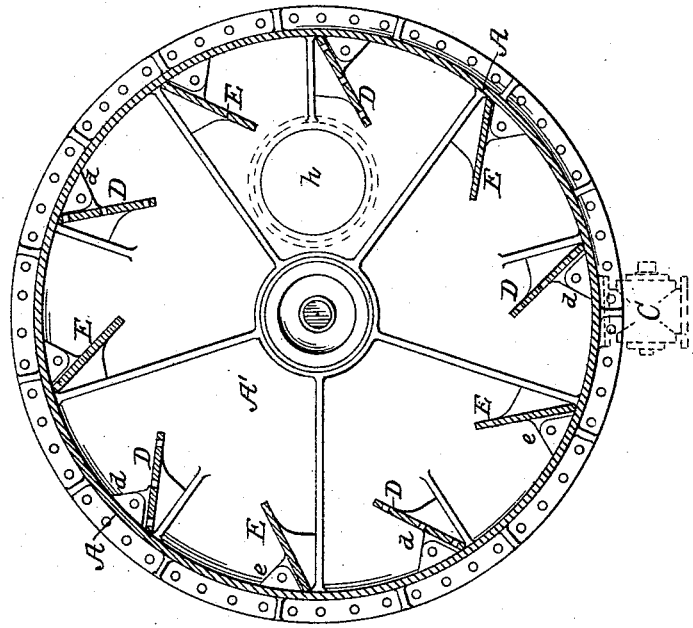
Figure 2:
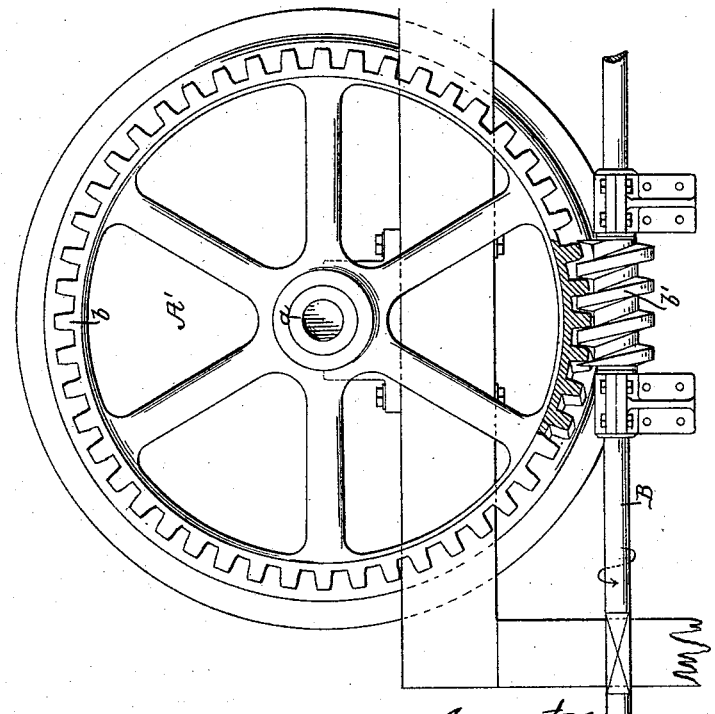

In the accompanying drawings: Figure 1, is a longitudinal section of our improved dissolver; Fig. 2, is an end view showing the driving gear; Fig. 3, is a section on the line 1—2, Fig. 1.

A is preferably a cast iron cylinder having heads A' A'. On these heads are trunnions $a$ $a$, and on an extension of one of these trunnions is a worm wheel $b$ meshing with a worm $b'$ on a driving shaft B, mounted in suitable bearings on the frame, through the medium of this gearing the casing is slowly revolved.

On the inner periphery of the casing is a series of lifting and agitating blades, every other blade D is perforated, while the alternating blades E are solid blades. These blades form a series of pockets $d$, $e$, as shown, and the material is carried up by these blades and percolates through the perforations in the blades D, but the blades E being solid, carry the undissolved material up into the least saturated solution, the material is consequently kept in a uniform density throughout, and quickly dissolved.

The material is fed into the cylinder through the man hole $f$, provided with a suitable cover $f'$, and the water is fed through the inlet pipe $g$, which passes through a suitable stuffing box in the cylinder in one of the trunnions $a$, as shown. A man hole $h$ in one of the heads of the cylinder is for the purpose of removing any one of the blades when it is necessary to repair them, or for the insertion of new blades. The material after being dissolved, can be removed through the spigot C, which is provided with a suitable valve $i$.

During the operation of the device, lumps of chloride of lime are carried up by the blades, the water is also carried by the said blades, flowing in streams through the perforated plates. The water as it passes through from the pockets formed by the said blades, wears away particles of the chloride of lime. The lumps that are not dissolved or eaten away are carried up by the blades until the blades reach such an inclination that the lumps will drop into the solution again. This process is repeated until the lime is thoroughly dissolved, and when settled the clear solution is drawn from the cylinder through the outlet spigot C to any suitable receptacle. The spigot C is only opened at the level of the bottom of the clear solution after settling. This is attained by turning the cylinder until the spigot is at the required level.

The material is dissolved cold, and to facilitate the solution we use compressed air during the treatment; this air is introduced through the inlet pipe $g$.

We claim as our invention:—

The combination in a chloride dissolver of the cylindrical casing, heads thereon, supporting trunnions carried by said heads, mechanism for revolving the same, a water inlet in one of said heads, alternate plain and perforated blades secured to the inner periphery of the cylinder, and an inlet and an outlet for the chloride to be treated, substantially as specified.

In testimony whereof we have signed our names to this specification in the presence of two subscribing witnesses.

GEORGE M. NEWHALL.
CHARLES L. HAMILTON.

Witnesses:
H. F. REARDON,
JOS. H. KLEIN.